United States Patent [19]
Ito et al.

[11] Patent Number: 5,993,694
[45] Date of Patent: Nov. 30, 1999

[54] WATER-SOLUBLE ELECTRICALLY-CONDUCTIVE POLYANILINE AND METHOD FOR PRODUCTION THEREOF AND ANTISTATIC AGENT USING WATER-SOLUBLE ELECTRICALLY-CONDUCTIVE POLYMER

[75] Inventors: Shoji Ito; Kazuhiko Murata; Yoshinobu Asako, all of Ibaraki, Japan

[73] Assignee: Nippon Shokubai Co., Ltd., Japan

[21] Appl. No.: 08/866,714

[22] Filed: May 30, 1997

[30] Foreign Application Priority Data

| Jun. 10, 1996 | [JP] | Japan | 8-147476 |
| Mar. 27, 1997 | [JP] | Japan | 9-075688 |
| Apr. 7, 1997 | [JP] | Japan | 9-088051 |

[51] Int. Cl.$^6$ ........................ H01B 1/12
[52] U.S. Cl. ........................ 252/500
[58] Field of Search ............... 252/500; 528/422, 528/210

[56] References Cited

U.S. PATENT DOCUMENTS

| 4,956,441 | 9/1990 | Kathirgamanthan et al. | 528/171 |
| 5,109,070 | 4/1992 | Epstein et al. | 525/189 |
| 5,256,454 | 10/1993 | Murai et al. | 427/498 |
| 5,266,617 | 11/1993 | Han | 524/392 |
| 5,354,816 | 10/1994 | Shimizu et al. | 525/535 |
| 5,370,825 | 12/1994 | Angelopoulos et al. | 252/500 |
| 5,437,893 | 8/1995 | Murai et al. | 427/259 |
| 5,569,708 | 10/1996 | Wudl et al. | 524/607 |
| 5,589,108 | 12/1996 | Shimizu et al. | 252/500 |
| 5,589,270 | 12/1996 | Murai et al. | 428/411.1 |
| 5,700,399 | 12/1997 | Shimzu et al. | 252/500 |

FOREIGN PATENT DOCUMENTS

| 0 459 255 A2 | 5/1991 | European Pat. Off. . |
| 0 614 123 A1 | 2/1994 | European Pat. Off. . |
| A-61-197633 | 9/1986 | Japan . |
| A-02-166165 | 6/1990 | Japan . |
| A-06-056987 | 3/1994 | Japan . |
| WO 91/06887 | 5/1991 | WIPO . |
| WO 87/05914 | 8/1997 | WIPO . |

OTHER PUBLICATIONS

Yue, Jiang et al., "Comparison of different synthetic routes for sulfonation of polyaniline", Polymer (1992) 33(20), pp. 4410–4418.

Neoh, K. G., et al., "Co–existence of external protonation and self–doping in polyaniline", Synth. Met. (1993), 60(1), pp. 31–21.

Journal of Japan Chemical Society, 1985, No. 6, pp. 1124–1130 (No English Abstract/Trans.) No Month.

Glossary II of Lecture Prescripts of the 64th Autumnal Annual Meeting of Japan Chemical Society, "Synthesis and Properties of Soluble Electrically–Conductive Macromolecule by . . . " p. 706, 1992 No Month.

J. Am. Chem. Soc., "Synthesis of Self–Doped Conducting Polyaniline" 1990, 112, 2800–2801 No Month.

J. Am. Chem. Soc., "Effect of Sulfonic Acid Group on Polyanline Backbone", 1991, 113, 2665–2671 No Month.

Polymer, "Comparison of different synthetic routes for sulphonation of polyaniline", 1992, vol. 33, 4410–4418 No Month.

(List continued on next page.)

*Primary Examiner*—Mark Kopec
*Attorney, Agent, or Firm*—Fish & Richardson P.C.

[57] ABSTRACT

The water-soluble electrically-conductive polyaniline of this invention is such that the aromatic rings of the skeleton thereof are substituted by an average of 0.1–4 sulfonic acid (salt) groups and an average of 0–3.9 H's or other substituents (providing that the total of the number of sulfonic acids (salts) and that of other substituents is 4) per aromatic ring and 0.025–1 nitrogen atom of each of the nitrogen atoms in the main skeleton is doped with an external dopant. It is obtained by causing polyaniline to react with chlorosulfuric acid and then subjecting the reaction product to hydrolysis.

The antistatic agent of this invention is formed by using a water-soluble electrically-conductive polymer which has been doped with an external dopant.

9 Claims, 7 Drawing Sheets

OTHER PUBLICATIONS

J. Am. Chem. Soc., "Synthesis and Physical Properties of Highly Sulfonated Polyaniline", 1996, 118, 2545–2555 No Month.

Polymer, "A Novel N–substituted polyaniline derivative", 1993, vol. 34, 158–162 No Month.

J. Am. Chem. Soc., "Synthesis of Water–Soluble Self–Acid–Doped Polyaniline", 1994, 116, 7939–7940 No Month.

J. Am. Chem. Soc., "Water–Soluble Self–Acid–Doped Conducting Polyaniline: Structure and Properties", 1994, 117, 10055–10062 No Month.

J. Am. Chem. Soc., "A New Water–Soluble, Self–Doping Conducting Polyaniline from Poly(o–aminobenzylphosphonic acid) and Its Sodium Salts: Synthesis and . . . ", 1995, 117, 8517–8523 No Month.

Chen et al "N–Substituted and Ring–Substituted Water Soluble Self Acid Doped Conducting Polyanilines . . . ", *Mat Res Sol Symp Proc,* vol. 413, pp. 471–481 1996 (No Month).

WATER-SOLUBLE ELECTRICALLY-CONDUCTIVE POLYANILINE AND METHOD FOR PRODUCTION THEREOF AND ANTISTATIC AGENT USING WATER-SOLUBLE ELECTRICALLY-CONDUCTIVE POLYMER

BACKGROUND OF THE INVENTION

1. Field of the Invention

This invention relates to a water-soluble electrically-conductive polyaniline and a method for the production thereof. The aqueous solution of the water-soluble electrically-conductive polyaniline is useful for preparing a commercially acceptable thin films by such a simple procedure such as spin coating, dip coating, or bar coating. The water-soluble electrically-conductive polyaniline can be utilized for various antistatic devices, transparent electrodes, shields against electromagnetic radiation, photovoltaic elements, organic electroluminescent elements, organic electrochromic elements, corrosion inhibitors, semiconductor photocatalysts, photoresists, nonlinear optical materials, and the like.

This invention further relates to an antistatic agent using a water-soluble electrically-conductive polymer. The aqueous solution of the antistatic agent is useful for preparing commercially acceptable thin films with fast and strong adhesion to polymer films, polymer fibers, and moldings of polymer resins by a simple procedure such as spin coating, dip coating, or bar coating. Further, the antistatic agent manifests excellent antistatic effects even under low humidity.

2. Description of the Prior Art

First, since the doped polyaniline is stable as an electrically-conductive polymer and derives from inexpensive raw materials, the development of the applications thereof to film electrodes, secondary batteries, capacitors, antistatic agents, shields against electromagnetic radiation, etc. is being promoted. However, the insoluble and infusible character of polyaniline prevent easy formation or fabrication. The solubilization of the polyaniline, therefore, is significant from the commercial point of view. From the standpoint of handling in a factory, solubility in water provides many advantages over solubility in other solvents.

Second, since polymer films, polymer fibers, moldings of polymer resin, etc. are electrical insulators, they tend to buildup static electricity to the extent of breaking electronic components, attracting dust, and possibly causing a fire. Thus, a solution of these issues is essential. Heretofore, surfactants have been mainly used as antistatic agents. Since surfactants show ionic conduction by moisture in the air, it is difficult to lower the surface resistance below $10^9$ ($\Omega,\square$) and still keep the antistatic effect tinder the condition of low humidity.

Another electron-conductive antistatic agent has also been known, where carbon black, fine powder of metals such as aluminum, copper, or silver, and fine powder of semiconductors such as indium tin oxide or fluorine-doped tin oxide are dispersed as fillers in a general-purpose polymer. Using these fillers, however, causes problems such as (1) fairly large amounts of fillers are required, (2) controlling the electric resistance is difficult because the electric resistance may suddenly decrease at certain amounts of filler addition, (3) the fillers will gradually come out to the surface of a coating film with age, preventing the film from acquiring a smooth surface, (4) the film has inferior transparency, and (5) the strength of the coating film is low.

Though the electrically-conductive polymers have a bright prospect of solving these problems, they are generally at a disadvantage in being neither moldable nor processible because of their insolubility and infusibility. The doped polyaniline, among other electrically-conductive polymers, features stability in the air, inexpensiveness of the raw materials and suitability for the development of applications. Polyaniline is insoluble and infusible, however, like other electrically-conductive polymers. Therefore, the solubilization of polyaniline is commercially significant. From the view points of handling in a factory, using water to dissolve polyanitive provides many advantages such as cost and safety compared to using organic solvents.

For the doped polyaniline which is useful for film electrodes, secondary batteries, capacitors, antistatic agents, shields against electromagnetic radiation, etc. and for the electrically-conductive polymers, particularly the doped polyaniline, which are useful for polymer films, polymer fibers, molding of polymer resin, etc., the necessity for improving the solubility of polyaniline in water has been getting attention.

For the purpose of improving the solubility of polyaniline in water, various methods for the introduction of a sulfonic group to the polyaniline have been proposed in recent years. Methods for polymerizing aminobenzene sulfonic acid as a monomer have been known such as, for example, synthesizing sulfonated polyaniline by electrochemically copolymerizing aniline with o- or m-aminobenzene sulfonic acid (Journal of Japan Chemical Society, 1985, p. 1123 and JP-A-02-166,165), copolymerizing aniline with aminobenzene sulfonic acid by chemical oxidation (JP-A-01-301,714 and JP-A-06-56,987), sulfonating the copolymer of aniline with aminobenzene sulfonic acid and a derivative thereof (JP-A-05-18, 989), polymerizing o-, m-aminobenzene sulfonic acid by electrochemical oxidation (Glossary II of Lecture Prescripts of the 64th Autumnal Annual Meeting of Japan Chemical Society, p. 706, 1992), and polymerizing o-, m-aminobenzene sulfonic acid and a derivative thereof by chemical oxidation (JP-A-07-324,132 and JP-A-08-41,320).

Further, methods for introducing a sulfonic group into the polyaniline through the medium of a sulfonating agent have been proposed such as, for example, sulfonating an emeraldine salt by the use of sulfuric anhydride/triethyl phosphate complex (JP-A-61-197,633), sulfonating undoped polyaniline (emeraldine base) by the use of fuming sulfuric acid (WO91-06887, J. Am Chem. Soc., 1990, Vol. 112, p. 2800, J. Am. Chem. Soc., 1991, Vol. 113, p 2665), sulfonating undoped polyaniline (emeraldine base) in chlorosulfonic acid (Polymer, 1991, Vol. 33, p 4410), and a method for sulfonating the polyaniline of a leucoemeraldine base with fuming sulfuric acid (J. Am. Chem. Soc., 1996, Vol. 118, p 2545).

The method for copolymerizing aminobenzene sulfonic acid and a derivative thereof with aniline by electrochemical or chemical oxidation, however, is barely capable of introducing sulfonic groups at a ratio of one sulfonic group to five aromatic rings. The product of this method, has a solubility problem because it is insoluble in water while it is slightly soluble in aqueous alkalis. Then, the method which further sulfonates such a copolymer is shown to introduce sulfonic groups at a ratio of slightly over one sulfonic group to two aromatic rings. The product of this method also has a solubility problem because it is insoluble in water though it is soluble in aqueous alkalis.

The method for polymerizing o-, m-aminobenzene sulfonic acid by electrochemically oxidation, in spite of the previous statement that the method has produced a water-soluble electrically-conductive polymer, has such problems that the method is not suitable for the manufacture on a commercial scale because the polymerization is an electrode reaction and isolation of the product is difficult. When the method for polymerizing o-, m-aminobenzene sulfonic acid and a derivative thereof in an acidic solution by chemical oxidation or a basic solution by chemical oxidation is verified, it is found to yield a reddish brown oligomer and to not form a sulfonated polyaniline in the state of an emeraldine salt as the repeating unit thereof. It is generally difficult to obtain a polyaniline of high molecular weight with green color which is characteristic for the emeraldine salt by polymerizing an aniline monomer possessing a substituent.

In the methods for introducing a sulfonic group by the use of a sulfonating agent, the method which sulfonates a polyaniline by the use of a sulfuric anhydride/triethyl phosphate complex barely introduces sulfonic groups at a ratio of one sulfonic group to five aromatic rings. The compound produced by this method, shows no solubility in water in the doped state. The method of the sulfonation by the use of fuming sulfuric acid affords a self-doped polyaniline with sulfonic groups at a rate of one sulfonic group to two aromatic rings. The polyaniline, however, is insoluble in neutral to acidic aqueous solutions because the sulfonic groups are utilized for doping the aniline. It, therefore, must react with an alkali to become soluble in the aqueous solutions. The polyaniline generally turns into an insulator when it reacts with an alkali. The self-doped polyaniline, therefore, does not fully satisfy needs of moldability and processibility because it must be redoped after processing.

The method of sulfonation by chlorosulfuric acid affords a self-doped polyaniline with four sulfonic groups per five aromatic rings. This polyaniline, however, is insoluble in neutral to acidic aqueous solutions because the sulfonic groups are utilized for doping the aniline and must react with an alkali to become soluble in the aqueous solutions. Thus, it is not suitable for processing. The method which sulfonates the polyaniline of a leucoemeraldine base with fuming sulfuric acid yields polyaniline with three sulfonic groups per four aromatic rings. Since this product is a self-doped one, it is only slightly soluble in water and is problematic in terms of solubility and processibility.

Further, in the methods of the sulfonation by the use of fuming sulfuric acid and chlorosulfuric acid mentioned above, since they use a large excess of the sulfonating agent relative to the amount of polyaniline, they have the problem of having to dispose a large amount of used acid.

Water-soluble polyanilines in the electrically conductive state have been known, including, namely in the doped state, N-sulfonated polyaniline resulting from the chemical oxidative polymerization of diphenyl amine-4-sulfonic acid (Polymer, 1993, Vol. 24, p. 158), N-propane sulfonic acid-substituted polyaniline resulting from the reaction of polyaniline with 1,3-propane sultone (J. Am. Chem. Soc., 1994, Vol. 116, p. 7939 and J. Am. Chem. Soc., 1995, Vol. 117, p. 10055), and phosphonated polyaniline resulting from oxidative polymerization of o-amino-benzyl phosphonic acid (J. Am. Chem. Soc., 1995, Vol. 117, p. 8517).

The isolation of the N-sulfonated polyaniline, however, is extremely complicated because the polymer possesses such high solubility as to necessitate high-speed centrifugation after the polymerization. Then, since the N-propane sulfonic acid-substituted polyaniline is a self-doped polyaniline and is insoluble in water in the doped state, it cannot be soluble in water in the doped state unless by a method of treating the aqueous solution of a sodium salt thereof with an ion-exchange resin. Thus, it has the problem of having no alternative but to use a very complicated procedure in terms processiblility. The phosphonated polyaniline has the problem of being unusually complicated from the commercial point of view because the production of the o-aminobenzyl sulfonic acid, the raw material for polymerization, requires several steps of reactions.

A water-soluble polyaniline in the conducting state, namely in the doped state, a method for producing this polyaniline with a simple procedure, and an antistatic agent using such a water-soluble electrically-conductive polymer as the polyaniline have never been heretofore known to the art.

The first object of this invention, therefore, is to provide a novel water-soluble electrically-conductive polyaniline and a method for the production thereof.

The first object of this invention also resides in providing a polyaniline which is soluble in water in the state having high electrical conductivity, namely in the doped state, and a method for the production thereof.

The second object of this invention is to provide, by using preferably the novel water-soluble electrically-conductive polyaniline (such as, for example, sulfonated polyaniline) mentioned above as a polymer soluble in water in the state having high electrical conductivity, namely in the doped state, an antistatic agent with lower resistance which retains the effect thereof even at and lower humidity than prevalent heretofore, excels in coating property and adhesiveness to a substrate, and enjoys fully satisfactory strength, transparency, and waterproofness after application to a surface.

SUMMARY OF THE INVENTION

The first object mentioned above is accomplished by the following items (1)–(5) and the second object mentioned above is accomplished by the following items (6)–(10).

(1) A water-soluble electrically-conductive polyaniline, aromatic rings of the skeleton of which are substituted by an average of 0.1–4 $SO_3M$ compounds, wherein M represents at least one member selected from the class consisting of hydrogen atom, alkali metal atom, alkaline earth metal atom, and ammonium group, and also substituted by an average of 0–3.9 R's, wherein R represents at least one member selected from the class consisting of hydrogen atom, halogen atom, alkyl group of 1–20 carbon atoms, alkoxy group of 1–20 carbon atoms, alkylthio group of 1–20 carbon atom, alkylamino group of 1–20 carbon atoms, carboxyl group, carboxylic ester groups having ester residue of 1–20 carbon atoms, nitro group, and cyano group, providing that the total of the number of $SO_3M$ and that of R is 4, per aromatic ring and 0.025–1 nitrogen atom of each of the nitrogen atoms in the main skeleton mentioned above is doped with an external dopant.

(2) A water-soluble electrically-conductive polyaniline, characterized by exhibiting solubility (25° C.) in water of not less than 0.5% by weight in the state having electrical conductivity of not less than $10^{-6}$ S/cm and being doped with an external dopant.

(3) A water-soluble electrically-conductive polyaniline according to (1) or (2) above, wherein the external dopant is the anion of a protonic acid.

(4) A method for the production of a water-soluble electrically-conductive polyaniline set forth in (1) above, characterized by subjecting polyaniline to hydrolysis after it has undergone a reaction with chlorosulfuric acid.

(5) A method according to (4) above, wherein the polyaniline is doped in advance with a dopant.

(6) A method according to (4) or (5) above, wherein the chlorosulfuric acid is used in an amount in the range of 0.5–3 mols per mol of the aromatic ring in the skeleton of polyaniline.

(7) An antistatic agent using a water-soluble electrically-conductive polymer doped with an external dopant.

(8) An antistatic agent using a water-soluble electrically-conductive polymer, the aromatic rings of the skeleton of which polymer are substituted by an average of 0.1–4 $SO_3M$ compounds, wherein M represents at least one member selected from the class consisting of hydrogen atom, alkali metal atom, alkaline earth metal atom, and ammonium group, and also substituted by an average of 0–3.9 R's, herein R represents at least one member selected from the class consisting of hydrogen atom, halogen atom, alkyl group of 1–20 carbon atoms, alkoxy groups of 1–20 carbon atoms, alkylthio groups of 1–20 carbon atoms, alkylamino group of 1–20 carbon atoms, carboxyl group, carboxylic ester group having ester residues of 1–20 carbon atoms, nitro group, and cyano group, providing that the number of $SO_3M$ and that of R is 4, per aromatic ring and 0.025–1 nitrogen atom of each of the nitrogen atoms in the main skeleton mentioned above is doped with an external dopant.

(9) An antistatic agent using a water-soluble electrically-conductive polymer, characterized by exhibiting solubility (25° C.) in water of not less than 0.5% by weight in the state having electrical conductivity of not less than $10^{-6}$ S/cm and being doped with an external dopant.

(10) An antistatic agent using a water-soluble electrically-conductive polymer set forth in any of (7) through (9) above, wherein the external dopant is the anion of protonic acid.

(11) An antistatic agent using a water-soluble electrically-conductive polymer set forth in (7) above as mixed with a water-soluble or water-dispersible polymer.

(12) An antistatic agent according to (11) above, wherein the water-soluble or water-dispersible polymer is an acrylic polymer.

The water-soluble electrically-conductive polyaniline of this invention can be converted, solely or as blended with a water-soluble resin, into a film by a simple method such as spin coating or dip coating and can be utilized as an electrically-conductive thin film for preventing static charging. By the method of this invention for the production of a water-soluble electrically-conductive polyaniline, an electrically-conductive polymer (preferably sulfonated polyaniline) which, unlike the conventional polyaniline, manifests solubility in water in the state having high electrical conductivity, namely in the doped state, can be obtained by a simple procedure.

The antistatic agent of this invention uses an electrically-conductive polymer (preferably sulfonated polyaniline) which, unlike the conventional equivalent, manifests solubility in water in the state having high electrical conductivity, namely in the doped state. It can be mixed freely with water-soluble polymers of polyacrylic acid or with aqueous polymer emulsions such as acrylic polymer emulsions. From the aqueous solution containing the antistatic agent of this invention, therefore, thin films can be formed evenly on polymer films, polymer fibers, and molding of polymer resin by a simple method such as spin coating, dip coating, or bar coating. The surface resistance of such a thin film can be adjusted to any value in the range of $10^5 \Omega/cm–10^{11} \Omega/cm$. The thin film manifests an outstanding effect in preventing static charging even under low humidity.

The antistatic thin film mentioned above can be thermally hardened (insolubilized) and the hardened thin film exhibit fully satisfactory adhesiveness to a substrate, strength, and waterproofness.

DESCRIPTION OF THE PREFERRED EMBODIMENT

Figure 1:
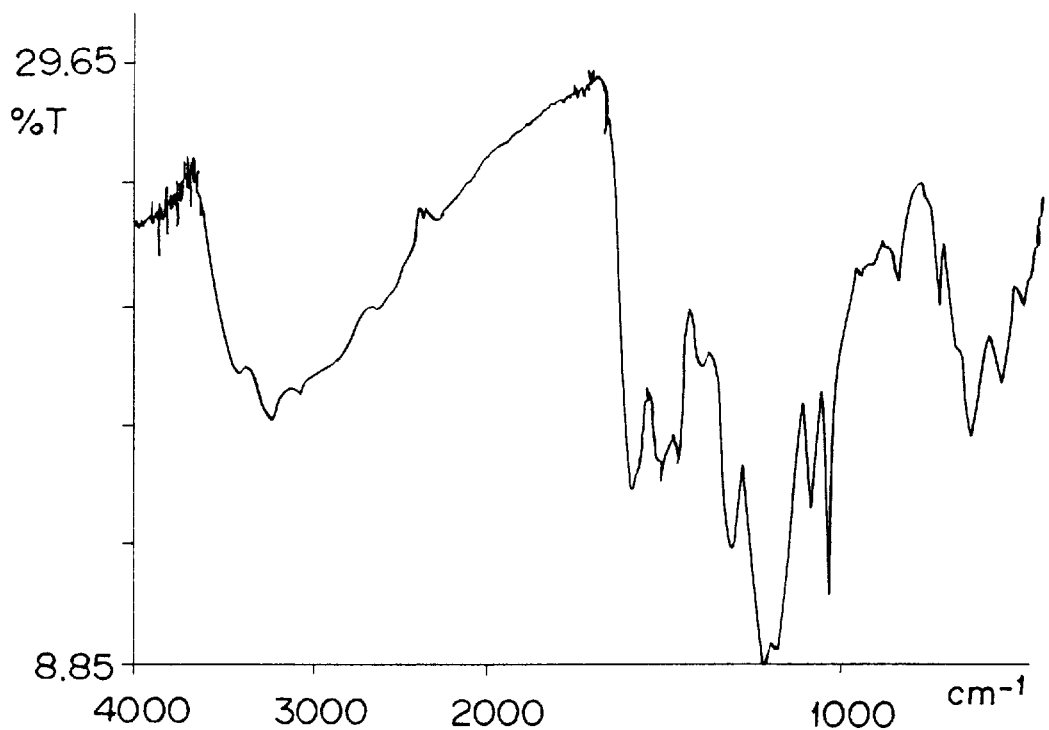
FIG. 1 is an FT-IR spectrum of an externally-doped sulfonated polyaniline of Example 1.

The water-soluble electrically-conductive polyaniline which is one of the means for the accomplishing of the first object of this invention has the aromatic rings of the skeleton of polyaniline substituted by an average of 0.1–4 $SO_3M$ compounds and an average of 0–3.9 R's (providing that the total of the number of $SO_3M$ and that of R is 4) per aromatic ring and has 0.025–1 nitrogen atom of each of the nitrogen atoms in the skeleton (excluding the nitrogen atoms in the substituents) doped with an external dopant.

Here, M in $SO_3M$ represents one member selected from the class consisting of hydrogen atom, alkali metal (such as, for example, sodium, potassium, and rubidium), alkaline earth metal (such as, for example, calcium and magnesium), and ammonium group. Among other members of the class mentioned above, hydrogen atom proves particularly preferable.

Then, R represents at least one member selected from the class consisting of hydrogen atom, halogen atom, preferably chlorine atom, fluorine atom, or bromine atom, alkyl group of 1–20, preferably 1–8, carbon atoms, alkoxy groups of 1–20, preferably 1–8, carbon atoms, alkylthio groups of 1–20, preferably 1–8, carbon atoms, alkylamino groups of 1–20, preferably 1–8, carbon atoms, carboxyl group, carboxylic ester groups of 1–20, preferably 1–8, carbon atoms, nitro group, and cyano group. Among other members of the class mentioned above, electron donating groups such as hydrogen atom, alkyl groups, alkoxy groups, alkylthio groups, and alkylamino groups prove particularly preferable.

Preferably, the average number of $SO_2M$ is 0.5–1.5 and the average number of R is 2.5–3.5, on the condition that the total of the two numbers is 4.

Further, 0.025–1, preferably 0.1–0.5, nitrogen atom of each of the nitrogen atoms in the main skeleton of the polyaniline is doped with an external dopant.

The water-soluble electrically-conductive polyaniline according to this invention, in terms of structural formula, comprises a repeating unit represented by the general formula (1)

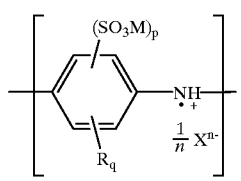

(1)

wherein M and R have the same meanings as defined above, p represents a value in the range of 0.1–4, q represents a value in the range of 0–3.9 (providing that p+q=4), X represents the anion of a protonic acid, and n represents the valency of the anion, which is generally 1–3, preferably 1 or 2, as an essential component and a repeating unit represented by the formula (2) and/or (3)

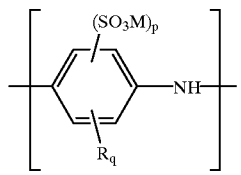

(2)

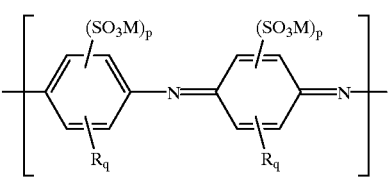

(3)

as an optional component.

As typical examples of the anion of a protonic acid, such anions of 1–3 valencies as chlorine ion, bromine ion, iodine ion, nitric acid ion, sulfate ion, phosphate ion, borofluoride ion, perchlorate ion, thiocyanate ion, acetate ion, propionate ion, p-toluene sulfonate ion, trifluoroacetate ion, and trifluoromethane sulfonate ion may be used. Among other anions mentioned above, anions of one to two valencies prove particularly preferable.

The degree of polymerization of the water-soluble electrically-conductive polyaniline according to this invention is in the range of 2–10,000, preferably 20–1,000.

The sulfonated polyaniline which is obtained as a typical example by this invention is found by elemental analysis to have a nitrogen/sulfur ratio in the range of 4/4–4/3, indicating that it incorporates therein 3–4 sulfonic acid groups per 4 aromatic rings. It has the chloride ion thereof doped at a doping ratio in the range of 50–100%. Unlike the self-doped polyaniline disclosed in WO91-06887, it is an externally-doped polyaniline.

The method for the production of a water-soluble electrically-conductive polyaniline which constitutes another means for accomplishing the first object of this invention is characterized by causing polyaniline to react with chlorosulfuric acid and then subjecting the reaction product to hydrolysis. Now, the method for the production of the water-soluble electrically-conductive polyaniline according to this invention will be described below.

This method of production comprises stirring and dispersing polyaniline in an organic solvent and heating the stirred mixture and meanwhile adding chlorosulfuric acid thereto and consequently subjecting the aromatic rings in the skeleton of polyaniline to chlorosulfation. The resultant chlorosulfonyl polyaniline, when further hydrolyzed in water, produces a sulfonated polyaniline which manifests solubility in water and possesses high electrical conductivity.

The polyaniline as the raw material may be either in the doped state (emeraldine salt) or in the undoped state (emeraldine base). The dopant for the emeraldine salt can be chosen from any of the protonic acids such as, for example, hydrochloric acid, sulfuric acid, nitric acid, borofluoric acid, perchloric acid, amidosulfuric acid, p-toluene sulfonic acid, acetic acid, and propionic acid. In order to reduce one-step, namely, undoping step, it is proper to use the polyaniline in the doped state (emeraldine salt). In either of the cases mentioned above, the greater part of the external dopant is the hydrochloric acid which is produced by the hydrolysis of chlorosulfonyl group, though part thereof possibly contains either the dopant of the polyaniline as the raw material or the sulfuric acid produced by the hydrolysis of excess chlorosulfuric acid. This phenomenon may be explained: the hydrochloric acid induces ion exchange because it is the most powerful in the relevant acids and possesses a great ability to supply protons. The failure of the self-doping action to occur in this case may be explained by the fact that the benzene sulfonic acid is a weak acid as compared with the hydrochloric acid.

The polyaniline and the derivative thereof which are used as the raw materials may be obtained by electrochemical or chemical oxidative polymerization of aniline and o-, m-substituted aniline. Since the electrical conductivity of the raw materials affects the electrical conductivity of the sulfonated polyaniline as the final product, it is proper to use polyaniline which has as high electrical conductivity as permissible. The polyaniline of this description is preferred to be an emeraldine salt from of unsubstituted polyaniline. Appropriately, the emeraldine salt from polyaniline is obtained by doping an emeraldine base form of polyaniline with a protonic acid. The emeraldine base is represented by the general formula (4)

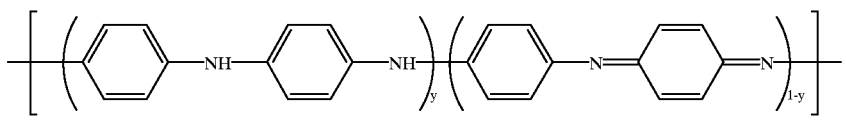

(4)

(wherein y=0.5) having a reducing unit (phenylene diamine skeleton) and an oxidizing unit (quinone imine skeleton) in an approximate ratio of 1:1.

There are generally two methods for producing an emeraldine salt form of polyaniline. One is electrochemical oxidative polymerization and the other is chemical oxidative polymerization using an oxidizing agent. From the commercial viewpoint, the method of chemical oxidative polymerization, which uses an oxidizing agent, is favorably used. The chemical oxidative polymerization of polyaniline is effected by adding to the acidic or basic solution of aniline or a derivative thereof an oxidizing agent and stirring them together.

The oxidizing agent to be used in this chemical oxidative polymerization is only required to be capable of oxidizing aniline. As typical examples of this oxidizing agent, persulfates such as ammonium persulfate, persulfuric acid, sodium persulfate, and potassium persulfate, hydrogen peroxide, and secondary iron chloride may be used. Among other oxidizing agents cited above, persulfates represented by ammonium persulfate prove particularly favorable. The amount of the oxidizing agent to be added is in the range of 0.1–5 mols, preferably 0.5–1 mol, per mol of the monomer.

As typical examples of the polymerization solvent, water, methanol, ethanol, isopropanol, acetonitrile, dimethyl formamide, acetone, 2-butanone, and dimethyl acetaldehyde may be used. Among other polymerization solvents mentioned above, water and methanol prove particularly favorable.

The reaction temperature of the polymerization is proper in the range of −15°–70° C., preferably in the range of −10°–20° C. If the reaction temperature deviates from the range mentioned above, the electrical conductivity will tend to be unduly low.

The amount of the chlorosulfuric acid to be used in the reaction of sulfonation of polyaniline mentioned above in the process for the production of a water-soluble electrically-conductive polyaniline according to this invention is in the range of 0.5–10 mols, preferably 0.5–3 mols, per mol of the aromatic rings of the polyaniline. If the amount of the chlorosulfuric acid is less than 0.5 mol per mol of the aromatic rings of the polyaniline, the reaction will result in introducing not more than one sulfonic group per two aromatic rings and the solubility in water will be unduly low. If the amount of chlorosulfuric acid exceeds 3 mols per mol of the aromatic rings of the polyaniline, the reaction will result in introducing sulfonic groups excessively and the conductivity will tend to be unduly low in spite of an increase in the solubility.

The solvent to be used in the reaction is only required to be incapable of reacting with the chlorosulfuric acid. As typical examples of the solvent which is effectively used herein, carbon disulfide, carbon tetrachloride, 1,1,2,2-tetrachloroethane, 1,2-dichloroethane, chloroform, and dichloroethane may be used. Among other solvents mentioned above, 1,2-dichloroethane and 1,1,2,2-tetrachloroethane prove particularly favorable because of their high compatibility with chlorosulfuric acid. The total amount of the solvent and the polyaniline to be used in the reaction is in the range of 1–30% by weight, preferably 2–10% by weight. If this amount deviates from the range mentioned above, the efficiency of the reaction will tend to be unduly low. The reaction temperature of the sulfonation is proper in the range of −20°–200° C., preferably 20°–150° C., and more preferably 40°–140° C. If the temperature deviates from the range mentioned above, the conductivity will tend to be unduly low.

The amount of the chlorosulfonated polyaniline to be added to the aqueous solvent in the hydrolysis is proper in the range of 0.1–10% by weight, preferably 0.5–5% by weight. If this amount deviates from the range mentioned above, the efficiency of the reaction will tend to be unduly low. The reaction temperature in this case is proper in the range of 20°–120° C., preferably 60°–120° C. If this temperature is lower than 20° C., the efficiency of the reaction will tend to be unduly low.

The water-soluble electrically-conductive polyaniline (sulfonated polyaniline) according to this invention which constitutes yet another means for the accomplishment of the first object of this invention, in the state having electrical conductivity of not less than $10^{-6}$ S/cm, preferably not less than $10^{-4}$ S/cm, manifests solubility in water (25° C.) of not less than 0.5% by weight, preferably not less than 3% by weight.

The high solubility in water which is manifested by the sulfonated polyaniline of this invention in the state having high electrical conductivity, namely in the doped state, is attributable to the fact that when the M in the —$SO_3M$ group introduced in the polyaniline chain comprises substantially wholly of H, the proton in the —$SO_3H$ group avoids being consumed in self-doping and persists in a free state, and therefore, can be dissociated in water. This description is verified by the following fact. In the first place, the IR absorption which is absent for the self-doped sulfonated polyaniline, namely a broad spectrum around 2500–3700 $cm^{-1}$ due to the —O—H stretching vibration of the —$SO_3H$ group, is observed for the sulfonated polyaniline of this invention.

In the second place, when the change in the visible absorption spectrum is traced while the neutralization of sulfonated polyaniline with an alkali is continued, the visible absorption spectrum shows no change while the amount of the alkali added is small, begins to show a rapid change when the amount reaches a certain level, and finally levels off to a fixed spectrum. This fact indicates that at first solely the neutralization of the —$SO_3H$ group occurs and then the undoping follows. In the third place, the curve of neutralization titration shows two end points due to the neutralization of the —$SO_3H$ group and the undoping thereof and the number of —$SO_3H$ groups and the doping ratio which are estimated from the two end points fall within the theoretically accepted ranges.

The substitution of M in the —$SO_3M$ group which is introduced into the skeleton of sulfonated polyaniline of this invention with an alkali metal atom, an alkaline earth metal atom, or an ammonium group can be accomplished by first synthesizing a sulfonated polyaniline having hydrogen atom as the substituent, M, and then neutralizing the sulfonated polyaniline with an alkali, thereby effecting ion exchange or carrying out the hydrolysis of the chlorosulfonyl group in an alkali. If the alkali in this case happens to be in an excess amount, the excess will induce an undoping action and possibly result in total loss of conductivity. The amount of the alkali, therefore, must be controlled so as to prevent the undoping action from being thoroughly completed. Preferably, not less than half of the M is hydrogen atom.

The sulfonated polyaniline of this invention manifests high solubility in water. The aqueous solution thereof, when applied to a substrate by the technique of spin coating, bar coating, or dip coating, readily produces an electrically-conductive film. For the sake of addition to strength, it may be used in a form blended with a commercially available water-soluble polymer. As typical examples of the water-soluble polymer which is usable for the blending, poly (acrylic acid), poly(vinyl alcohol), poly(styrene sulfonic acid), poly(vinyl sulfonic acid), poly (2-acrylamide-2-methyl propane sulfonic acid), polyallylamine, and polyethylenimine may be used. Particularly, such acidic polymers as poly (acrylic acid), poly (styrene sulfonic acid), poly (vinyl sulfonic acid), and poly(2-acrylamide-2-methyl propane sulfonic acid) which avoid inducing polyaniline to undergo undoping are particularly favorably used. In all the polymers mentioned above, poly(acrylic acid) can be used most favorably because it manifests high compatibility with the sulfonated polyaniline of this invention when it is blended therewith and forms a transparent film.

The electrical conductivity of polyaniline and that of the sulfonated polyaniline of this invention can be determined by performing the four-probe DC method on a sample of compressed pellets or on a sample of film obtained by coating from the aqueous solution. The surface resistance of an antistatic film obtained by coating from the aqueous solution of a resin composition produced by blending the sulfonated polyaniline of this invention with a general-purpose aqueous solution polymer is determined by performing the two-probe method on a film sample with a vacuum deposited gold electrode.

The antistatic agent which constitutes the means for accomplishing the second object of this invention is produced by using a water-soluble electrically-conductive polymer which is doped with an external dopant.

The expression that the water-soluble electrically-conductive polymer to be used in the antistatic agent of this invention is "soluble in water" indicates that the solubility of the polymer in water is not less than 0.01%, preferably not less than 0.5%.

As typical examples of the water-soluble electrically-conductive polymer to be used in the antistatic agent of the present invention, water-soluble electrically-conductive polypyrrole, water-soluble electrically-conductive polythiophene, water-soluble electrically-conductive polyparaphenylene, water-soluble electrically-conductive poly(paraphenylene vinylene), and water-soluble electrically-conductive polyaniline may be used. To acquire an addition to the solubility in water, the water-soluble electrically-conductive polymers mentioned above are preferred to be of the externally doped one over the self-coped one. In all the externally doped water-soluble electrically-conductive polymers, the externally doped water-soluble electrically-conductive polyaniline is used most advantageously in terms of stability in the air. The externally doped water-soluble electrically-conductive polyaniline mentioned above equals the water-soluble electrically-conductive polyaniline which constitutes the means for accomplishing the first object of this invention. The description concerning the externally doped water-soluble electrically-conductive polyaniline, therefore, will be omitted herein below because it overlaps with the contents of the water-soluble electrically-conductive polyaniline and the method for the production thereof which have been described above.

As typical examples of the substrate for the application of the antistatic agent of this invention, polymer film, polymer fibers, moldings of polymer resin, paper, and glass may be cited. Among other substrates mentioned above, the polymer film proves particularly favorable. As typical examples of the polymer film, polyester films such as poly(ethylene terephthalate) may be used. The polyester film is extensively used as the bases for an overhead projector sheet, a video tape, an audio tape, a computer tape, and a floppy disk, for example.

For the application of the antistatic agent of this invention to the substrate, techniques such as spin coating, bar coating, gravure coating, kiss coating, blade coating, roll coating, and dip coating can be used.

Since the water-soluble electrically-conductive polymer to be used in the antistatic agent of this invention manifests high solubility in water, the aqueous solution solely of the polymer can be directly applied to the substrate. It may be used, when necessary for the sake of being improved in coating property, adhesiveness to the substrate, and strength and waterproofness of the produced coat, as blended with a water-soluble polymer or an aqueous polymer emulsion (water-dispersible polymer). The mixing ratio of the water-soluble polymer or the aqueous polymer emulsion to the total amount of the water-soluble electrically-conductive polymer is in the range of 0.01–0.99, preferably 0.1–0.9.

As typical examples of the water-soluble polymer mentioned above, homopolymers such as poly(ethylene glycol), poly(vinyl pyrrolidone), poly(vinyl alcohol), poly(acryl amide), poly(sodium acrylate), poly(acrylic acid), poly(2-acrylamide-2-methyl propane sulfonic acid), poly(sodium styrene sulfonate), poly(styrene sulfonic acid), poly(vinyl sulfonic acid), polyallylamine, and polyethylenimine and copolymers containing such components may be used. As typical examples of the aqueous polymer emulsion mentioned above, such aqueous acryl emulsions as are obtained by (co) polymerizing acrylic acid, methacrylic acid, methyl acrylate, methyl methacrylate, ethyl acrylate, ethyl methacrylate, propyl acrylate, propyl methacrylate, butyl acrylate, butyl methacrylate, hexyl acrylate, hexyl methacrylate, octyl acrylate, octyl methacrylate, hydroxyl acrylate, hydroxyl methacrylate, cyclohexyl acrylate, and cyclohexyl methacrylate may be used.

For the purpose of enabling the antistatic agent of this invention to acquire lower resistance, such acidic polymers of poly(acrylic acid), poly(2-acrylamide-2-methyl propane sulfonic acid), poly(styrene sulfonic acid), and poly(vinyl sulfonic acid) which avoid inducing the water-soluble electrically-conductive polymer to undergo a undoping action are used particularly properly among other water-soluble polymers enumerated above. Satisfactory results are obtained likewise by using aqueous acryl emulsions.

For the purpose of improving the sulfonated polyaniline in coating property to a polyester film and transparency of the produced coat, the aqueous acryl emulsions of poly (vinyl alcohol), polyacrylamide, and poly(acrylic acid) can be used particularly favorably because of their high compatibility with the sulfonated polyaniline among other polymers for blending enumerated above.

The antistatic agent of this invention, depending on the purpose for which it is used, must be insolubilized after being applied to a surface so as to retain adhesiveness and strength enough to resist separation even by scratching from the substrate. The antistatic agent of this invention, whether it is formed solely of a water-soluble electrically-conductive polymer or it is formed of the polymer as blended with other water-soluble polymer, can be insolubilized by cross-linkage. For the purpose of enabling the antistatic agent, after being cross-linked, to secure adhesiveness and strength enough to resist separation by scratching from the substrate, the antistatic agent is preferred to be used as blended with poly(acrylic acid) in particular. The cross-linking agent to be used herein is only required to be capable of reacting with the sulfonic group of the sulfonated polyaniline and/or such functional group as carboxyl group, sulfonic group, hydroxyl group, or amino group in the polymer for blending. As typical examples of the cross-linking agent, such epoxy compounds as alkylene glycol diglycidyl ethers may be used. The amount of the cross-linking agent to be added is in the range of 0.1–10%, preferably 0.5–3%, based on the amount of the solids of the antistatic agent. The cross-linkage is preferred to be performed at a temperature in the range of 150°–200° C. for several minutes.

For the purpose of satisfying the various conditions including the low resistance, the transparency of the produced coat, the coating property to a polyester film, and the adhesiveness and strength due to the insolubilization after the application to a surface mentioned above, the water-soluble electrically-conductive (sulfonated) polyaniline is preferred to be used as blended with polyacrylic acid. The conditions mentioned above also can be fulfilled by using an aqueous acrylic emulsion.

Properly, the poly(acrylic acid) has such a high average molecular weight as falls in the range of 1,000–1,000,000, preferably 250,000–1,000,000. The high molecular weight is preferred because the aqueous solution of the antistatic agent acquires high viscosity and manifests a high coating property to the polyester film. Since the polyester film generally assumes hydrophobicity, it repels the aqueous solution. For this aqueous solution to be perfectly applied to the polyester film, therefore, it requires use of such an additive as a fluorine based surfactant which has a strong action of lowering surface tension. When the aqueous solution is used as blended with the poly(acrylic acid) of a high molecular weight, however, the necessity for the surfactant is obviated because of the action of the polyacrylic acid to enhance viscosity. Another advantage which is derived from using a poly(acrylic acid) having a high molecular weight of not less than 250,000 is the fact that the aqueous solution is thermally insolubilized to the extent of manifesting fully satisfactory adhesiveness and strength even in the absence of a cross-linking agent. This improvement may be logically explained by a assumption that the molecular weight of the polyacrylic acid of the high molecular weight is further increased by the application of heat. The temperature of the heating for causing the insolubilization is in the range of 150°–300° C., preferably 180°–220° C. and the time of this heating is in the range of 1–3 minutes. These conditions prove advantageous because they do not cause any change in the electrical resistance of the applied coat. If the heating is continued for a period exceeding the upper limit of the range mentioned above, it will cause an undue increase in the electrical resistance.

When the aqueous solution of the antistatic agent is used as blended with an aqueous acryl emulsion, it can be applied to the polyester film without requiring any other additive. The applied layer of the aqueous solution, on being heated at a temperature in the range of 80°–120° C. for several minutes, forms a coating which excels in adhesiveness and strength.

The mixing ratio of the water-soluble electrically-conductive polymer to the polyacrylic acid or the aqueous acrylic emulsion is preferred to be such that the ratio of the polyacrylic acid or the aqueous acrylic emulsion to the total amount of the sulfonated polyaniline falls in the range of 0.01–0.95, preferably 0.5–0.8.

The surface resistance of the film to which the antistatic agent of this invention is applied is determined by performing the two-probe method on a film sample with a vacuum deposited metallic electrode. The adhesiveness of the antistatic agent to the substrate is determined by pasting an adhesive cellophane tape to the sample film and peeling it from the sample and examining the tape to find the amount of the sample remaining on the tape. The strength of the coating after being hardened is judged by scratching the surface of the coating with nails and finding whether or not the scratching causes separation of the coating.

Now, this invention will be described more specifically below with reference to working examples.

EXAMPLE 1

To 300 ml of an aqueous solution containing hydrochloric acid in a concentration of 1.2 mols/liter, 28 g of aniline was added dropwise and stirred. The resultant solution was cooled to 0° C. A solution of 30 g of ammonium persulfate in 60 ml of deionized water was added dropwise to the former solution over a period of 30 minutes. After completion of the dropwise addition, the solution consequently formed was stirred at 0° C. for 5 hours. The produced green precipitate was separated by filtration. The filtrate was washed with deionized water until the color thereof ceased to exist. It was further washed with methanol until the color vanished. The dry weight of the product was 12.5 g.

The polyaniline consequently obtained was formed in pellets and tested for electrical conductivity by the four-probe method. The electrical conductivity was found to be 2.02 S/cm.

In 50 ml of 1,1,2,2-tetrachloroethane (hereinafter referred to as "TCE"), 1 g of the produced polyaniline was dispersed and heated to 85° C. A solution of 2.4 g (about 2 mols) of chlorosulfuric acid in 6 ml of TCE was dropwise added thereto. After completion of the dropwise addition, the resultant solution was heated and stirred at 85° C. for 5 hours. The hot solution was cooled to room temperature and filtered to extract the reaction product. The reaction product was washed with chloroform. It was air-dried and then dispersed in 50 ml of deionized water, and refluxed by application of heat for 4 hours. The green solution consequently obtained was filtered to remove insoluble components. The filtrate was concentrated by the use of a rotary evaporator and then induced by the addition of acetone to form a green precipitate. The precipitate was separated by filtration and washed with acetone. The product was found to have a dry weight of 1.4 g.

This product was found by elemental analysis to comprise 4.11% of H, 32.86% of C, 7.02% of N, 14.46% of S, and 4.57% of Cl and possess a compositional formula, $C_{24}H_{36}N_{4.4}O_{20}S_4Cl_{1.1}$. It had a sulfur to nitrogen (S/N) ratio of 0.91. On the assumption that all the sulfur atoms present in the produced polyaniline originated from the introduced sulfonic groups, the polyaniline is substituted by not less than 9 sulfonic groups per 10 aromatic rings thereof. On the assumption that all the ion pairs were those of $Cl^-$, it follows that the doping ratio was 0.25 (50%).

When the product was tested for solubility in water at 25° C., the solubility was found to be 8.1% by weight.

The produced sulfonated polyaniline was formed in pellets and tested for electrical conductivity by the four-probe method. The electrical conductivity was consequently found to be $1.99 \times 10^{-3}$ S/cm.

EXAMPLE 2

A dispersion of 9 g of the polyaniline obtained in Example 1 in 270 ml of 1,2-dichloroethane was heated to 85° C. A solution of 21.8 g (about 2 equivalent mols) of chlorosulfuric acid in 15 ml of 1,2-dichloroethane was added dropwise thereto. After completion of the dropwise addition, the resultant solution was heated and stirred at 85° C. for 5 hours. The hot solution was cooled to room temperature and then filtered to separate the reaction product. The reaction product was washed with chloroform. It was air-dried, dispersed in 400 nil of deionized water, and refluxed by application of heat for 4 hours. The produced green solution was filtered to remove the insoluble components. The filtrate was concentrated by the use of a rotary evaporator and induced by the addition of acetone to form a green precipitate. The precipitate was separated by filtration and washed with acetone. The dry weight of the product was 12.0 g.

This product was found by elemental analysis to comprise 3.52% of H, 49.24% of C, 8.28% of N, 13.78% of S, and 2.99% of Cl and possess a compositional formula, $C_{24}H_{30}N_{4.3}O_{15}S_{3.2}Cl_{0.7}$. It had an S/N ratio of 0.73. On the assumption that all the sulfur atoms present in the produced polyaniline originated from the introduced sulfonic groups, the polyaniline is substituted by slightly less than 3 sulfonic groups per 4 aromatic rings. On the assumption that all the ion pairs were those of $Cl^-$, it follows that the doping ratio was 0.17 (35%).

When the product was tested for solubility in water at 25° C., the solubility was found to be 4.7% by weight.

The produced sulfonated polyaniline was formed in pellets and tested for electrical conductivity by the four-probe method. The electrical conductivity was consequently found to be $5.72 \times 10^{-3}$ S/cm.

EXAMPLE 3

To 300 ml of an aqueous solution containing hydrofluoric acid in a concentration of 1.2 mols/liter, 28 g of aniline was added dropwise and stirred. The resultant solution was cooled to 0° C. A solution of 30 g of ammonium persulfate in 60 ml of deionized water was added dropwise to the former solution over a period of 30 minutes. After completion of the dropwise addition, the solution consequently formed was stirred at 0° C. for 5 hours. The produced green precipitate was separated by filtration. The filtrate was washed with deionized water until the color thereof ceased to exist. It was further washed with methanol until the color vanished. The dry weight of the product was 15.8 g.

The polyaniline consequently obtained was formed in pellets and tested for electrical conductivity by the four-probe method. The electrical conductivity was found to be 4.60 S/cm.

In 150 ml of TCE, 2.8 g of the produced polyaniline was dispersed and heated to 85° C. A solution of 8.8 g (about 2.5 equivalent mols) of chlorosulfuric acid in 30 ml of TCE was dropwise added thereto. After completion of the dropwise addition, the resultant solution was heated and stirred at 85° C. for 5 hours. The hot solution was cooled to room temperature and filtered to extract the reaction product. The reaction product was washed with chloroform. It was air-dried and then dispersed in 150 ml of deionized water, and refluxed by application of heat for 4 hours. The green solution consequently obtained was filtered to remove insoluble components. The filtrate was concentrated by the use of a rotary evaporator and then induced by the addition of acetone to form a green precipitate. The precipitate was separated by filtration and washed with acetone. The product was found to have a dry weight of 1.4 g.

This product was found by elemental analysis to comprise 3.58% of H, 36.29% of C, 7.43% of N, 14.90% of S, and 5.94% of Cl and possess a compositional formula, $C_{24}H_{28}N_4O_{30}S_{3.5}Cl_{1.5}$. It had an S/N ratio of 0.95. On the assumption that all the sulfur atoms present in the produced polyaniline originated from the introduced sulfonic groups, the polyaniline is substituted by nearly one sulfonic group per aromatic ring thereof. No fluorine atom was detected in the polyaniline. This fact indicates that all the ion pairs of $BF_4^-$ in the raw material were exchanged with $Cl^-$. The doping ratio, therefore, was found to be 0.375 (75%).

When the product was tested for solubility in water at 25° C., the solubility was found to be 9.1% by weight.

The produced sulfonated polyaniline was formed in pellets and tested for electrical conductivity by the four-probe method. The electrical conductivity was consequently found to be $5.38 \times 10^{-6}$ S/cm.

EXAMPLE 4

To 300 ml of an aqueous solution containing sulfuric acid in a concentration of 1.2 mols/liter, 28 g of aniline was added dropwise and stirred. The resultant solution was cooled to 0° C. A solution of 30 g of ammonium persulfate in 60 ml of deionized water was added dropwise to the former solution over a period of 30 minutes. After completion of the dropwise addition, the solution consequently formed was stirred at 0° C. for 5 hours. The produced green precipitate was separated by filtration. The filtrate was washed with deionized water until the color thereof ceased to exist. It was further washed with methanol until the color vanished. The dry weight of the product was 14.9 g.

The polyaniline consequently obtained was formed in pellets and tested for electrical conductivity by the four-probe method. The electrical conductivity was found to be 0.89 S/cm.

In 50 ml of TCE, 1.1 g of the produced polyaniline was dispersed and heated to 85° C. A solution of 2.5 g (about 2 equivalent mols) of chlorosulfuric acid in 6 ml of TCE was dropwise added thereto. After completion of the dropwise addition, the resultant solution was heated and stirred at 85° C. for 5 hours. The hot solution was cooled to room temperature and filtered to extract the reaction product. The reaction product was washed with chloroform. It was air-dried and then dispersed in 50 ml of deionized water, and refluxed by application of heat for 4 hours. The green solution consequently obtained was filtered to remove insoluble components. The filtrate was concentrated by the use of a rotary evaporator and then induced by the addition of acetone to form a green precipitate. The precipitate was separated by filtration and washed with acetone. The product was found to have a dry weight of 1.4 g.

This product was found by elemental analysis to comprise 3.72% of H, 38.80% of C, 7.68% of N, 15.62% of S, and 2.00% of Cl and possess a compositional formula, $C_{24}H_{38}N_4O_{21}S_4Cl_1$. It had an S/N ratio of 1.0. On the assumption that all the sulfur atoms present in the produced polyaniline originated from the introduced sulfonic groups, the polyaniline is substituted by one sulfonic group per aromatic ring thereof. On the assumption that all the ion pairs were those of $Cl^-$, it follows that the doping ratio was 0.25 (50%).

When the product was tested for solubility in water at 25° C., the solubility was found to be 8.8% by weight.

The produced sulfonated polyaniline was formed in pellets and tested for electrical conductivity by the four-probe method. The electrical conductivity was consequently found to be $6.25 \times 10^{-4}$ S/cm. Control A self-doped polyaniline was prepared by the method disclosed in WO91-06887. In 40 ml of fuming sulfuric acid, 0.2 g of the polyaniline in the undoped state was dissolved and stirred at room temperature for 3 hours. The reaction solution was dumped in 200 ml of ice-bathed methanol to induce precipitation. The precipitate consequently formed was separated by filtration and washed with acetone. The product was found to have a dry weight of 0.25 g.

This product was found by elemental analysis to comprise 3.91% of H, 49.72% of C, 9.86% of N, and 9.06% of S and possess a compositional formula, $C_{24}H_{27}N_4O_{9.4}S_{1.6}$. On the assumption that all the sulfur atoms originated from the introduced sulfonic groups, the polyaniline is substitued by four sulfonic groups per 10 aromatic rings thereof.

When the product was tested for solubility in water at 25° C., it was found o be completely insoluble in water.

When the self-doped polyaniline consequently obtained was formed in pellets and tested for electrical conductivity by the four-probe method, the electrical conductivity was found to be $0.98 \times 10^{-2}$ S/cm. The surface resistance of a thin film formed of the polyaniline defined determination because of the insolubility of the polyaniline in water.

EXAMPLE 5

Figure 2:
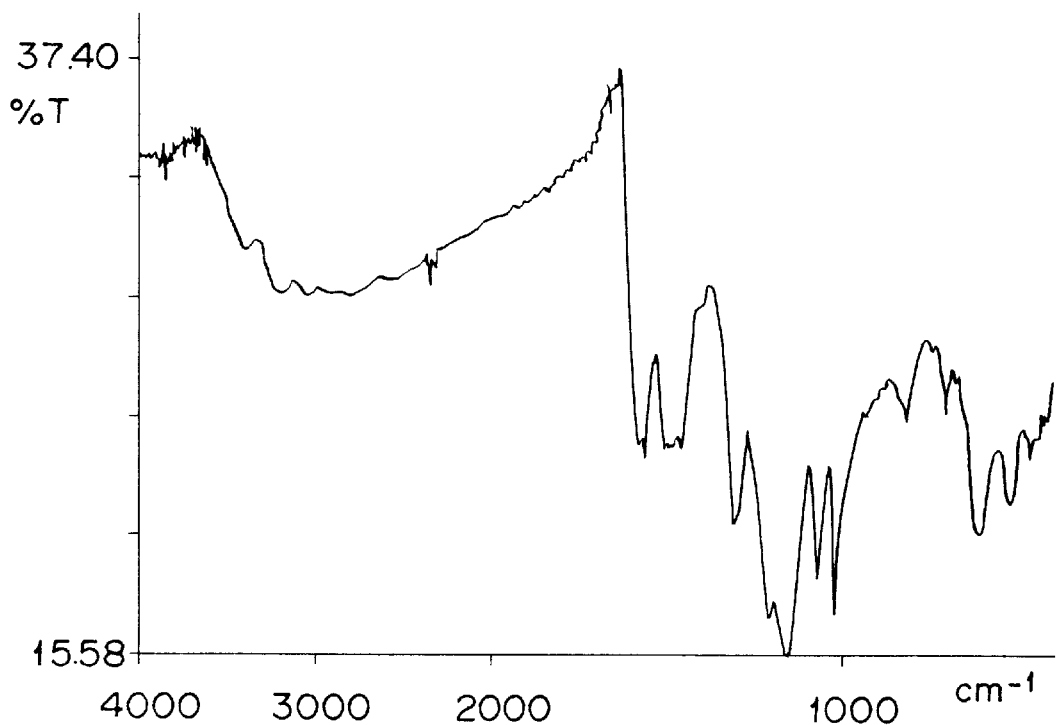
FIG. 2 is an FT-IR spectrum of an externally-doped sulfonated polyaniline of Example 2.
Figure 3:
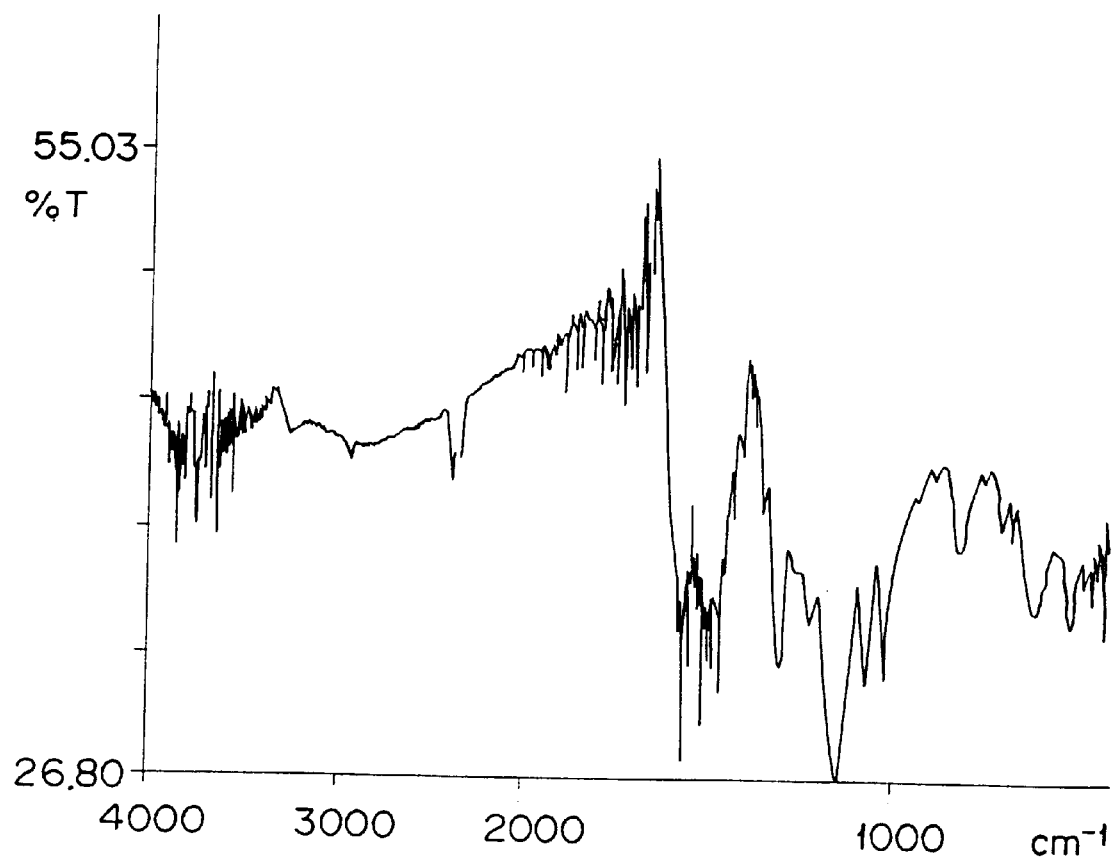
FIG. 3 is an FT-IR spectrum of a self-doped sulfonated polyaniline of a control.

The FT-IR spectrums of the externally-doped sulfonated polyanilines obtained in Examples 1 and 2 and the self-doped sulfonated polyaniline obtained in Control are shown respectively in FIG. 1, FIG. 2, and FIG. 3. The spectral analysis was effected by preparing a sample of KBr tablets of a given sulfonated polyaniline and assaying the sample by the use of an FT-IR spectrometer produced by Perkin Elmer Corp and marketed under product code of "1600." In the spectrum obtained of the sulfonated polyaniline of Example 1, the absorptions at 1172 cm$^{-1}$ and 1074 cm$^{-1}$ respectively represent the antisymmetric and symmetric stretching vibrations of O=S=O and the absorptions at 703 cm$^{-1}$ and 615 cm$^{-1}$ respectively represent stretching vibrations of S—O and C—S. The absorption at 818 cm$^{-1}$ represents the out-of-plane stretching vibration of a 1,2,4-trisubstituted aromatic ring. The absorptions mentioned above were likewise found in the spectra of the sulfonated polyanilines of Example 2 and Control. This fact indicates that all the sulfonated polyanilines contained the —SO$_3$— group which was directly bonded to an aromatic ring. As the absorptions characteristic for the spectra of the sulfonated polyanilines of Example l and Example 2, the broad absorptions observed throughout the area of 2500–3700 cm$^{-1}$ may be cited. These broad absorptions were due to the probe —O—H stretching vibration of the —SO$_3$H group. This fact implies that the —SO$_3$H group was not used as a dopant and was present in a free state.

EXAMPLE 6

Figure 4:
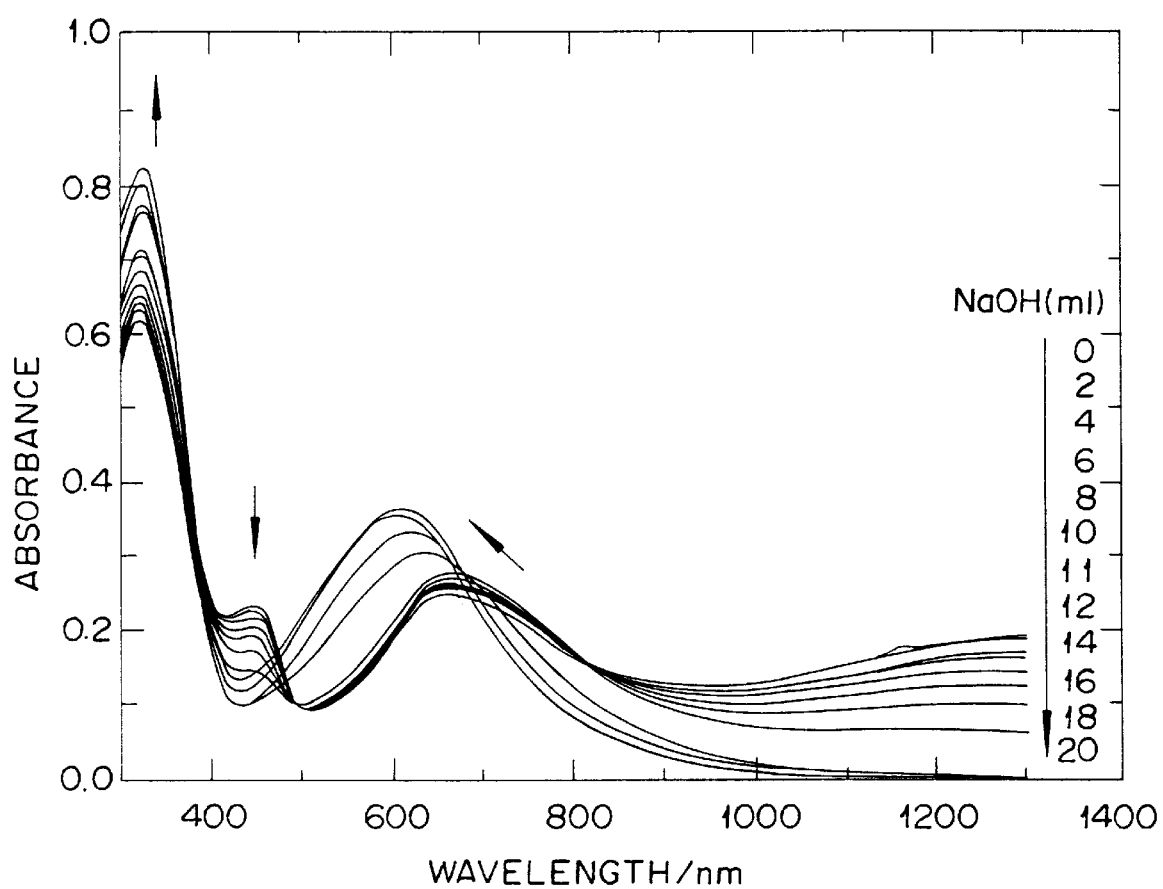
FIG. 4 is a diagram showing ultraviolet-visible radiation absorption spectra of aqueous solutions obtained by neutralizing 10 ml of an aqueous solution containing sulfonated polyaniline of Example 1 in a concentration of about 0.2 g/liter with 0, 2, 4, 6, 7, 8, 9, 10, 11, 12, 14, 16, 17, 18, 19, 20, 22, and 24 ml of an aqueous 1 m.mol/liter sodium hydroxide solution and then diluting the resultant neutralized solutions with distilled water each to a total volume of 100 ml.
Figure 5:
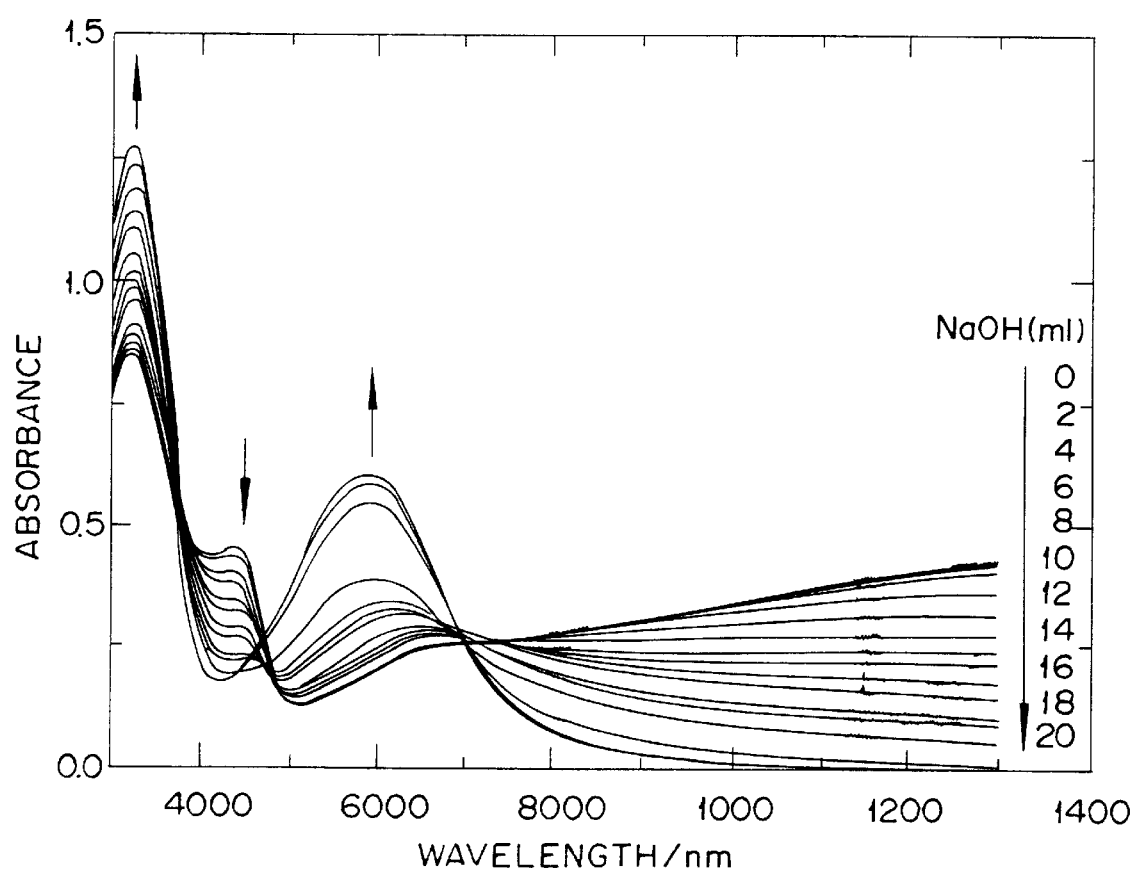
FIG. 5 is a diagram showing ultraviolet-visible radiation absorption spectra of aqueous solutions obtained by neutralizing 10 ml of an aqueous solution containing sulfonated polyaniline of Example 1 in a concentration of about 0.2 g/liter with 0, 2, 4, 6, 8, 10, 12, 14, 16, 17, 18, and 20 ml of an aqueous 1 m.mol/liter sodium hydroxide solution and their diluting the resultant neutralized solutions with distilled water each to a total volume of 100 ml.

Aqueous solutions were prepared by neutralizing 10 ml of an aqueous solution containing the sulfonated polyaniline of Example 1 in a concentration of about 0.2 g/liter with 0, 2, 4, 6, 7, 8, 9, 10, 11, 12, 14, 16, 17, 18, 19, 20, 22, and 24 ml severally of an aqueous 1 m.mol/liter sodium hydroxide solution and then diluting the resultant neutralized solutions with distilled water each to a total volume of 100 ml. The ultraviolet-visible radiation absorption spectra of these aqueous solutions are collectively shown in FIG. 4. In the absorption spectrum prior to the addition of sodium hydroxide, an absorption due to the π–π* transition is found at 316 nm (3.92 eV) and an absorptions due to the Polaron band are found near 440 nm (2.82 eV) and 1300 nm (0.95 eV). These absorptions are characteristic for a doped polyaniline. Aqueous solutions were prepared by similarly neutralizing the sulfonated polyaniline obtained in Example 2. The ultraviolet-visible absorption spectra of these aqueous solutions are collectively shown in FIG. 5. In the absorption spectrum prior to the addition of sodium hydroxide, an absorption due to the π–π* transition is found at 318 nm (3.90 eV) and an absorptions due to the Polaron band are found near 440 nm (2.82 eV) and 1300 nm (0.95 eV). These absorptions are characteristic for a doped polyaniline which are similarly found in the absorption spectrum of the sulfonated polyaniline of Example 1, though the absorptions of Example 2 are greater in intensity than those of Example 1. This fact implies that the sulfonated polyaniline of Example 2 was doped more with the external dopant. The π–π* transition absorptions (3.92 eV and 3.90 eV) of the sulfonated polyanilines of Examples 1 and 2 are shifted toward the shorter wavelength side as compared with the π–π* transition absorption (3.81 eV : of the unsubstituted polyaniline salt or the π–π* transition absorption (3.88 eV) of the self-doped polyaniline of Control. This short wavelength shift may be logically explained by an assumption that the aromatic rings of polyaniline are twisted and the conjugation is weakened by the steric repulsion of the substituted —SO$_3^-$ group. This shift, therefore, serves as an index which grows in proportion to an increase in the number of —SO$_3^-$ groups to be introduced. This theory is consistent with the fact that the sulfonated polyaniline of Example 1 has about one —SO$_3$H group per aromatic ring and the sulfonated polyaniline of Example 2 has 3 —SO$_3$H groups per 4 aromatic rings, whereas the self-doped polyaniline of Control has about one —SO$_3$— group per two aromatic rings.

Figure 6:
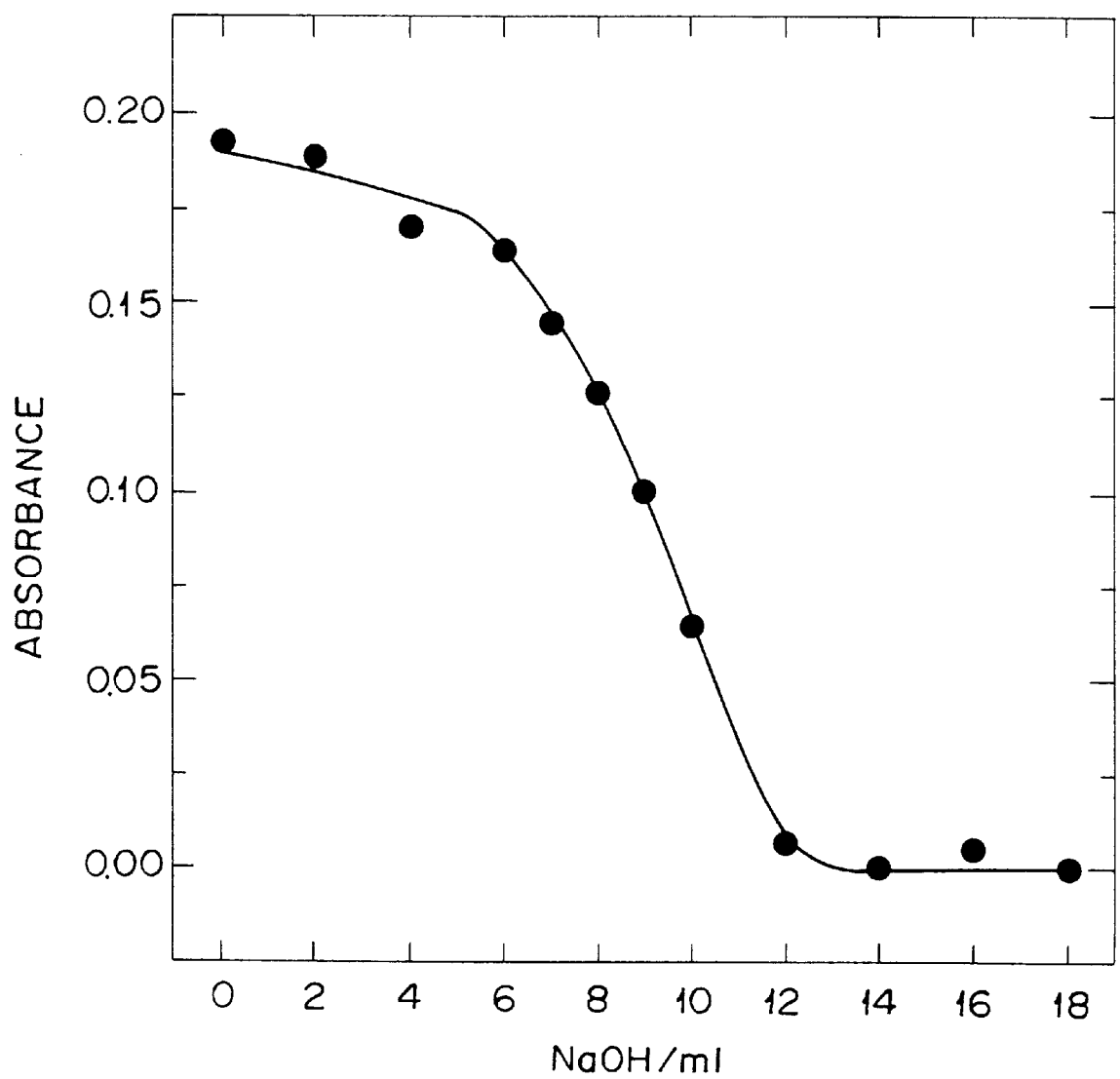
FIG. 6 is a diagram obtained by plotting the changes in the absorbance of the Polaron band absorption (wavelength 1300 nm) possessed by the sulfonated polyaniline of Example against the amounts of sodium hydroxide added.

As the sulfonated polyanilines of Examples 1 and 2 are gradually neutralized with sodium hydroxide, the absorption spectra thereof show virtually no change while the amount of sodium hydroxide added is still small, begin to change when the amount passes a certain level and increases rapidly, and ultimately cease to change even when the amount increases any further. This trend is evident from the curve of FIG. 6 obtained by plotting the Polaron band absorption at 1300 nm of the sulfonated polyaniline of Example 1 relative to the amount of sodium hydroxide added. From the results shown above, it is clear -hat the free protons of the —SO$_3$H group are gradually neutralized with sodium hydroxide while the amount of sodium hydroxide added is still small and the undoping action is initiated after the neutralization is completed.

Figure 7:
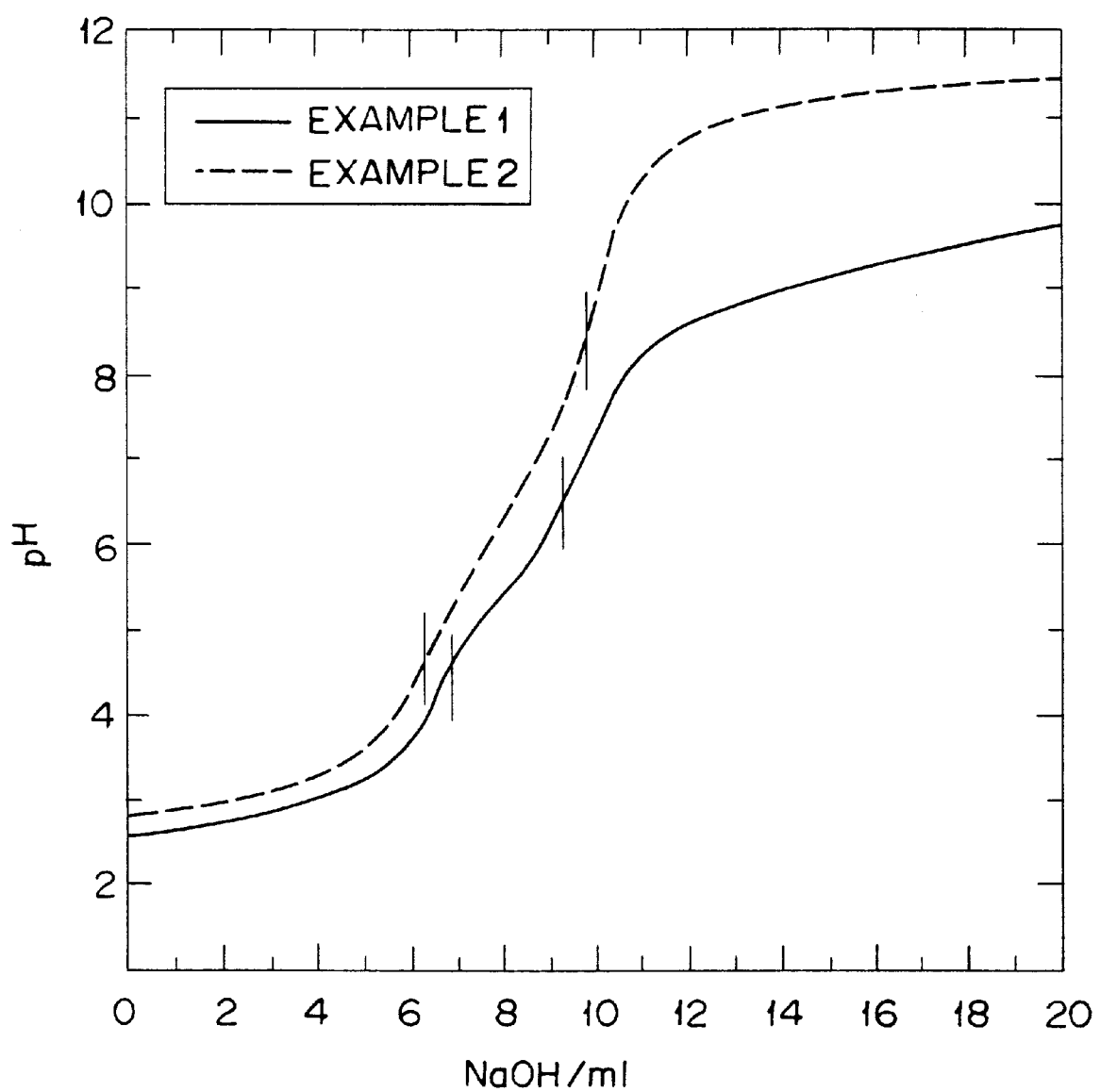
FIG. 7 is a diagram obtained by plotting the results of neutralization titration of aqueous solutions containing samples of sulfonated polyaniline of Example 1 and Example 2 in a concentration of about 0.1 mol/liter with an aqueous 0.1 mol/liter sodium hydroxide solution against the amounts of sodium hydroxide added.

Aqueous solutions containing the sulfonated polyanilines of Example 1 and Example 2 in a concentration of about 0.1 mol/liter were prepared and subjected to neutralizing titration with an aqueous 0.1 mol/liter sodium hydroxide solution by the use of an automatic titrating apparatus produced by Hiranuma Sangyo K.K. and marketed under trademark designation of "Comtite-500 type." The results are shown in FIG. 7. In the curve obtained of the sulfonated polyaniline of Example 1, two end points are detected at 6.8 ml and 9.6 ml of the volume of the aqueous sodium hydroxide solution added and they respectively correspond to the neutralization and the undoping of the —SO$_3$H group. The number of —SO$_3$H groups calculated from the results shown above is slightly over 3 per 4 aromatic rings of the polyaniline and the doping ratio is found to be 0.31 (61%). In the curve obtained of the sulfonated polyaniline of Example 2, two end points are detected at 6.4 ml and 10.1 ml of the volume of the sulfonated polyaniline of Example 2 and they respectively correspond to the neutralization and the undoping of the —SO$_3$H group similarly to the curve of the sulfonated polyaniline of Example 1. The number of —SO$_3$H groups calculated from the results shown above is slightly over 2 per 4 aromatic rings of the polyaniline and the doping ratio is found to be 0.30 (60%). Since the numbers of —SO$_3$H groups found as above are both smaller than those found by the elemental analysis, it is not unlikely that all the sulfur atoms of the sulfonated polyanilines of Example 1 and Example 2 did not originate from the —SO$_3$H groups. It is at least certain, however, that the polyanilines introduced not less than 2 —SO$_3$H groups per 4 aromatic rings thereof.

EXAMPLE 7

Coating liquids were prepared by dissolving the sulfonated polyanilines of Examples 1, 2, 3, and 4, each in 0.1 g, together with 0.1 g of poly(acrylic acid) (average molecular weight 2,000) produced by Aldrich Chemical Company, Inc. in 4 ml of deionized water and they were applied one each to cleaned slide glasses by the technique of spin coating. The obtained thin films were dried at 60° C. for 1 hour. Consequently, light green transparent films were obtained. These sulfonated polyaniline-poly(acrylic acid) resin compositions of Examples 1, 2, 3, and 4, with a vacuum deposited gold electrode, were tested for surface resistance. Their surface resistances were found respectively to be $6.30 \times 10^9 \Omega$, $6.0 \times 10^6 \Omega$, $3.82 \times 10^{11} \Omega$, and $5.12 \times 10^{10}$ $\Omega/\square$.

EXAMPLE 8

A coating liquid was prepared by dissolving 0.1 g of the sulfonated polyaniline obtained in Example 1 in 5 ml of deionized water. When this coating liquid was left flowing down through a filter, 0.2 μm in pore diameter, it completely passed the filter without leaving any solid particle behind thereon. This aqueous solution was applied to a cleaned slide glass by the technique of spin coating. When the thin film was dried at 60° C. for 1 hour, a light bluish green transparent film, 0.20 μm in thickness, was obtained. This film was found by a test to have a surface resistance of $1.0 \times 10^8 \Omega$.

EXAMPLE 9

A coating liquid was prepared by dissolving 0.1 g of the sulfonated polyaniline obtained in Example 2 in 5 ml of deionized water. When this coating liquid was left flowing down through a filter, 0.2 μm in pore diameter, it completely passed the filter without leaving any solid particle behind thereon. This aqueous solution was applied to a cleaned slide glass by the technique of spin coating. When the thin film was dried at 60° C. for 1 hour, a light green transparent film, 0.26 μm thickness, was obtained. This film was found by a test to have a surface resistance of $2.6 \times 10^6 \Omega$.

EXAMPLE 10

Figure 8:
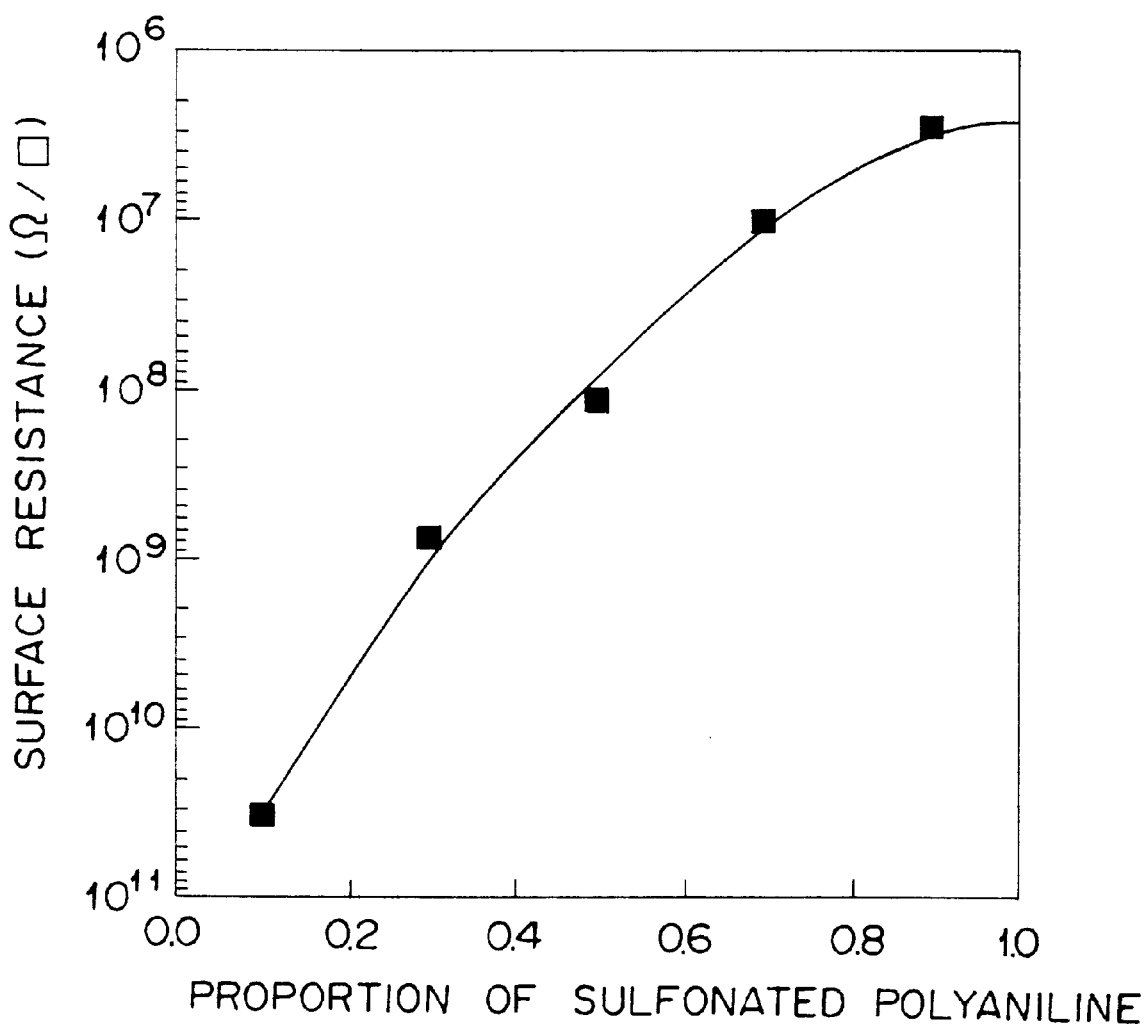
FIG. 8 is a diagram showing the relation between the surface resistance of a mixed film of sulfonated polyaniline with polyacrylic acid in Example 2 and the mixing ratio (proportion of sulfonated polyaniline to the total amount of solids).

Aqueous solutions having a solid content of 5% were prepared by mixing the sulfonated polyaniline obtained in Example 2 with polyacrylic acid having an average molecular weight of 10,000 (produced by Nippon Shokubai Co., Ltd. and marketed under trademark designation of "Aqualic HL-415") at varying weight ratios. These aqueous solutions were applied one each to slide glasses by the technique of spin coating to produce thin films. The thin films were tested for surface resistance. The results are shown collectively in FIG. 8. They indicate that the surface resistance decreased exponentially in accordance as the ratio of sulfonated polyaniline to the total solids content increased the antistatic agent of this invention, therefore, is characterized by having the electrical resistance thereof freely controlled by simply varying the ratio of the sulfonated polyaniline.

EXAMPLE 11

Aqueous solutions having a solid content of 5% were prepared by mixing the sulfonated polyaniline obtained in Example 2 with the following polymers at a weight ratio of 1:1.

Poly(ethylene glycol) (PEG) of an average molecular weight of 20,000: produced by Wako Pure Chemical Industries, Ltd.

Poly(vinyl pyrrolidone) (PVP) of an average molecular weight of 40,000: produced by Tokyo Chemical Industry Co., Ltd. and marketed under product code of "K-30."

Poly(vinyl alcohol) (PVA) : produced by Kuraray Co., Ltd. And marketed under product code of "117H."

Polyacrylamide (PAAM): produced by Wako Pure Chemical Industries, Ltd.

Poly(sodium acrylate) (PSAA): produced by Nippon Shokubai Co., Ltd. and marketed under trademark designation of "Aqualic DL-40S."

Poly(acrylic acid) (PAA) of an average molecular weight of 10,000: produced by Nippon Shokubai Co., Ltd. and marketed under trademark designation of "Aqualic HL-415."

Poly(2-acrylamide-2-methyl propane sulfonic acid) (PAMPS) obtained by polymerizing 2-acrylamide-2-methyl propane sulfonic acid: produced by Nitto Chemical Industry Co., Ltd.

Poly(sodium styrene sulfonate) (PSSS) of an average molecular weight of 70,000: produced by Aldrich Chemical Company, Inc.

Poly(styrene sulfonic acid)(PSS) obtained by acidifying the PSSS mentioned above with an ion-exchange resin produced by Japan Organo Co., Ltd. and marketed under trademark designation of "Amberlite IR-118."

Poly(vinyl sulfonic acid) (PVS) obtained by acidifying the polysodium vinyl sulfonate produced by Aldrich Chemical Company, Inc. with an ion-exchange resin produced by Japan Organo Co., Ltd. and marketed under trademark designation of "Amberlite IR-118." The aqueous solutions mentioned above were applied one each to slide glasses by the technique of spin coating to produce thin films. The thin films were tested for surface resistance, transmittance, film-forming property, and transparency. The results are shown collectively in Table 1.

TABLE 1

| Mixed polymer | Surface resistance (Ω) | Transmittance (%) | Film-forming property | Transparency |
|---|---|---|---|---|
| PEG | $2.2 \times 10^9$ | 66–89 | X | ◯ |
| PVP | $4.7 \times 10^9$ | 70–91 | X | ◯ |
| PVA | $9.5 \times 10^7$ | 43–80 | ◯ | ◯ |
| PAAM | $1.1 \times 10^8$ | 31–72 | ◯ | ◯ |

TABLE 1-continued

| Mixed polymer | Surface resistance (Ω) | Transmittance (%) | Film-forming property | Transparency |
|---|---|---|---|---|
| PSAA | $6.6 \times 10^8$ | 63–87 | X | ○ |
| PAA | $4.4 \times 10^7$ | 46–80 | ○ | ○ |
| PAMPS | $2.5 \times 10^7$ | 24–31 | Δ | X |
| PSSS | $4.9 \times 10^7$ | 21–41 | X | X |
| PSS | $5.6 \times 10^7$ | 28–47 | X | X |
| PVS | $6.6 \times 10^6$ | 17–51 | Δ | X |

The film-forming property and the transparency mentioned in the table were rated on the following scales.

| (Film-forming property) | ○: | Permitting even application |
|---|---|---|
| | Δ: | Permitting uneven application unevenly |
| | X: | Too repelling to permit application |
| (Transparency) | ○: | Transparent |
| | X: | Turbid |

It is clear from the results of Table 1 above that poly(vinyl alcohol), polyacrylamide, and poly(acrylic acid) are excellent polymers for blending.

EXAMPLE 12

Coating liquids of varying concentrations were prepared by dissolving the sulfonated polyaniline obtained in Example 2 in deionized water. These coating liquids were applied one each to cleaned slide glasses by the technique of spin coating. The thin films consequently formed were dried at 60° C. for 1 hour to produce transparent films of varying wall thicknesses. These films were tested for wall thickness, surface resistance, and transmittance. The results are shown in Table 2.

TABLE 2

| Thickness of film (μm) | Surface resistance (Ω) | Transmittance (%) - Minimum–Maximum |
|---|---|---|
| 0.38 | $6.0 \times 10^5$ | 28–71 |
| 0.26 | $2.6 \times 10^6$ | 40–75 |
| 0.11 | $4.5 \times 10^6$ | 67–87 |
| 0.046 | $2.2 \times 10^7$ | 85–95 |
| 0.018 | $3.5 \times 10^8$ | 94–98 |
| <3 nm | $2.0 \times 10^{10}$ | –100 |

It is clear from the results of Table 2 that even the very thin films, less than 3 nm in wall thickness, retained an antistatic effect.

EXAMPLE 13

When an aqueous solution containing the sulfonated polyaniline obtained in Example 2 in a concentration of 5% by weight was tried for application to a poly(ethylene terephthalate) (PET) film by the technique of spin coating, it was repelled by the film and could not be easily applied thereto.

An aqueous solution having a solid content of 5% by weight was prepared by mixing the sulfonated polyaniline obtained in Example 2 with poly(acrylic acid) of an average molecular weight of 800,000 (produced by Nippon Shokubai Co., Ltd. and marketed under trademark designation of "Aqualic HL-580") at a weight ratio of solids of 1:1. When this aqueous solution was applied on the PET film, it was not repelled by the film but allowed to produce a smooth transparent film.

EXAMPLE 14

To an aqueous solution containing the sulfonated polyaniline obtained in Example 2 in a concentration of 5% by weight, poly(ethylene glycol) diglycidyl ether (produced by Nagase Kasei Kogyo K. K. and marketed under trademark designation of "Denacol EK-810") was added as a crosslinking agent in an amount calculated to form a proportion of 3% by weight of the total amount of solids. This aqueous solution was applied to a slide glass by the technique of spin coating to produce a thin film. The thin film was heated at 200° C. for 3 minutes. The thin film was insolubilized by the heating and, when exposed to water, did not flow out of the slide glass.

EXAMPLE 15

An aqueous solution having a solid content of 5% by weight was prepared by mixing the sulfonated polyaniline obtained in Example 2 with poly(acrylic acid) of an average molecular weight of 800,000 (produced by Nippon Shokubai Co., Ltd. and marketed under trademark designation of "Aqualic HL-580") at a weight, ratio of solids of 1:1. This aqueous solution was applied to a slide glass by the technique of spin coating to produce a thin film. The thin film was heated at 200° C. for 3 minutes. The thin film was insolubilized by the heating and, when exposed to water, did not flow out of the slide glass.

EXAMPLE 16

Aqueous solutions having a solid content of 2.5% by weight were prepared by mixing the sulfonated polyaniline obtained in Example 2 with polyacrylic acid of an average molecular weight of 800,000 (produced by Nippon Shokubai Co., Ltd. and marketed under trademark designation of "Aqualic HL-580") at varying weight ratios of solids. These aqueous solutions were applied one each to poly (ethylene terephthalate) (PET) films to produce coatings. These coatings were tested for surface resistance, transmittance, and coating property. They were insolubilized by application of heat at 200° C. for three minutes and then tested for adhesiveness, strength, and resistance to water. The results are shown in Table 3.

TABLE 3

| Mixing ratio | Surface resistance (Ω) | Transmittance (%) | After heating at 200° C. for 3 minutes | | | |
|---|---|---|---|---|---|---|
| | | | Coating property | Adhesiveness | Strength | Resistance to water |
| 9/1 | $9.7 \times 10^6$ | 77–91 | ○ | ○ | Δ | ○ |
| 8/2 | $1.2 \times 10^7$ | 76–90 | ○ | ○ | ○ | ○ |
| 7/3 | $1.6 \times 10^7$ | 79–92 | ○ | ○ | ○ | ○ |
| 6/4 | $3.4 \times 10^7$ | 78–92 | ○ | ○ | ○ | ○ |
| 5/5 | $6.4 \times 10^7$ | 82–94 | ○ | ○ | ○ | ○ |

The components involved in the mixing ratio and the scales used for rating the coating property, adhesiveness, strength, and resistance to water mentioned in the table above are shown below.

| (Mixing ratio) | Sulfonated polyaniline/polyacrylic acid |
| --- | --- |
| (Coating property) | ○: Permitting even application |
| | ∆: Permitting uneven application unevenly |
| | X: Too repelling to permit application |

(Adhesiveness) This property was determined by applying an adhesive cellophane tape to a sample and peeling the tape from the sample and examining the sample to find whether or not the peeling separated the sample from the substrate.

○: no separation

∆: Partial separation

X: Complete separation (Strength) This property was determined by rubbing a finger nail against a sample and examining the sample to find whether or not the rubbing caused separation.

○: No separation

∆: Partial separation

X: Complete separation (Resistance to water) This property was determined by dipping a sample in water and examining the sample to find whether or not the coating flowed out of the substrate.

○: No flowout

X: Partial flowout

EXAMPLE 17

An aqueous solution having a solid content of 5% by weight was prepared by mixing the sulfonated polyaniline obtained in Example 2 with an acrylic polymer emulsion (produced by Nippon Shokubai Co., Ltd. and marketed under trademark designation of "Acryset EX-16") at a weight ratio of solids of 1:1. When this solution was applied to a poly(ethylene terephthalate) (PET) film, it formed an even transparent thin film. It was found by a test to have a surface resistance of $1.9 \times 10^7 \Omega$. This thin film possessed ample resistance to water and, when exposed to water, did not flow out of the substrate. When this thin film was hardened by being heated at 150° C. for 1 hour, it acquired adhesiveness fast enough to resist separation when an adhesive cellophane tape was applied thereto and subsequently peeled off, and strength great enough to resist separation when a finger nail was rubbed there against.

The entire disclosure of Japanese Patent Application No. 08-147,476 filed on Jun. 10, 1996, Japanese Patent Application No. 09-75,688 filed on Mar. 27, 1997 and Japanese Patent Application No. 09-88,051 filed on Apr. 7, 1997 including specifications, claims, drawings and summaries are incorporated herein by reference in its entirely.

What is claimed is:

1. A water-soluble electrically-conductive polyaniline, aromatic rings of the skeleton of which are substituted by an average of 0.1–4 $SO_3M$ compounds, wherein M represents at least one member selected from the group consisting of hydrogen atom, alkali metal atom, alkaline earth metal atom, and ammonium group, and also substituted by an average of 3.9–0 R's, wherein R represents at least one member selected from the group consisting of hydrogen atom, halogen atom, alkyl group of 1–20 carbon atom, alkylthio group of 1–20 carbon atoms, alkylamino group of 1–20 carbon atoms, carboxyl group, carboxylic ester group having ester residues of 1–20 carbon atoms, nitro group, and cyano group, providing that the total of the number of $SO_3M$ and that of R is 4, per aromatic ring and 0.025–1 nitrogen atoms in said main skeleton is doped with an external halide ion, the polyaniline having solubility (25° C.) in water of not less than 0.5% by weight and having electrical conductivity of not less than $10^{-6}$ S/cm.

2. A water-soluble electrically-conductive polyaniline according to claim 1, wherein R represents a hydrogen atom.

3. A water-soluble electrically-conductive polyaniline according to claim 1, wherein R represents at least one member selected from the group consisting of alkylthio group of 1–20 carbon atoms, alkylamino group of 1–20 carbon atoms, carboxyl group, carboxylic ester group having ester residues of 1–20 carbon atoms, and cyano group.

4. An antistatic agent comprising a water-soluble electrically-conductive polyaniline, aromatic rings of the skeleton of which polymer are substituted by an average of 0.1–4 $SO_3M$ compounds, wherein M represents at least one member selected from the group consisting of hydrogen atom, alkali metal atom, alkaline earth metal atom, and an ammonium group, and also substituted by an average of 3.9–0 R's, wherein R represents at least one member selected from the group consisting of hydrogen atom, halogen atom, alkyl group of 1–20 carbon atoms, alkylthio group of 1–20 carbon atoms, alkylamino group of 1–20 carbon atoms, carboxyl group, carboxylic ester group having ester residues of 1–20 carbon atoms, nitro group, and cyano group, providing that the total of the number of $SO_3M$ and that of R is 4, per aromatic ring and 0.025–1 nitrogen atom of each of the nitrogen atoms in said main skeleton is doped with an external halide ion, the polyaniline having solubility (25° C.) in water of not less than 0.5% by weight and having electrical conductivity of not less than $10^{-6}$ S/cm.

5. An antistatic agent according to claim 4, wherein R represents a hydrogen atom.

6. An antistatic agent according to claim 4, wherein R represents at least one member selected from the group consisting of alkylthio group of 1–20 carbon atoms, alkylamino group of 1–20 carbon atoms, carboxyl group, carboxylic ester group having ester residues of 1–20 carbon atoms, and cyano group.

7. A water-soluble electrically-conductive polyaniline, aromatic rings of the skeleton of which are substituted by an average of 0.1–0.95 $SO_3M$ compounds, wherein M represents at least one member selected from the group consisting of hydrogen atom, alkali metal atom, alkaline earth metal atom, and ammonium group, and also substituted by an average of 3.9–3.05 R's, wherein R represents at least one member selected from the group consisting of hydrogen atom, halogen atom, alkyl group of 1–20 carbon atom, alkoxy group of 1–20 carbon atoms, alkylthio group of 1–20 carbon atoms, alkylamino group of 1–20 carbon atoms, carboxyl group, carboxylic ester group having ester residues of 1–20 carbon atoms, nitro group, and cyano group, providing that the total of the number of $SO_3M$ and that of R is 4, per aromatic ring and 0.025–1 nitrogen atom of each of the nitrogen atoms in said main skeleton is doped with an external halide ion.

8. A water-soluble electrically-conductive polyaniline according to claim 7, wherein R represents a hydrogen atom.

9. A water-soluble electrically-conductive polyaniline according to claim 7, wherein R represents at least one member selected from the group consisting of alkylthio group of 1–20 carbon atoms, alkylamino group of 1–20 carbon atoms, carboxyl group, carboxylic ester group having ester residues of 1–20 carbon atoms, and cyano group.

* * * * *